(12) United States Patent
Baker, III et al.

(10) Patent No.: US 7,747,785 B2
(45) Date of Patent: Jun. 29, 2010

(54) INSTANT MESSAGING PLUG-INS

(75) Inventors: James H Baker, III, Sammamish, WA (US); Jennifer L Bayer, Redmond, WA (US); John S Holmes, Seattle, WA (US); Katrina M Blanch, Seattle, WA (US); Wendy K Cook, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 715 days.

(21) Appl. No.: 11/279,865

(22) Filed: Apr. 14, 2006

(65) Prior Publication Data

US 2007/0244980 A1    Oct. 18, 2007

(51) Int. Cl.
*G06F 15/16* (2006.01)
(52) U.S. Cl. .................. 709/250; 709/206; 709/219
(58) Field of Classification Search ............. 709/250, 709/206, 219
See application file for complete search history.

(56) References Cited

U.S. PATENT DOCUMENTS

| | | | | |
|---|---|---|---|---|
| 6,763,373 | B2* | 7/2004 | Shiigi | 709/206 |
| 7,124,123 | B1* | 10/2006 | Roskind et al. | 706/60 |
| 2002/0073042 | A1* | 6/2002 | Maritzen et al. | 705/64 |
| 2003/0126136 | A1* | 7/2003 | Omoigui | 707/10 |
| 2003/0144894 | A1* | 7/2003 | Robertson et al. | 705/8 |
| 2003/0195976 | A1* | 10/2003 | Shiigi | 709/230 |
| 2004/0006706 | A1* | 1/2004 | Erlingsson | 713/200 |
| 2004/0249899 | A1* | 12/2004 | Shiigi | 709/206 |
| 2005/0044197 | A1* | 2/2005 | Lai | 709/223 |
| 2005/0091111 | A1* | 4/2005 | Green et al. | 705/14 |

OTHER PUBLICATIONS

.NET Framework Security, Brian A. LaMacchia et al. (2002), excerpts provided from chapters 9 & 10.*
Trillian IM client screenshot.*
Trizilla, Trillian IM client plugin README file.*
Trizilla SOURCEFORGE screenshot providing reference date.*
"Your Own AIM Bot! Weeee!," Evil Dragon, Mar. 3, 2004.*
.NET Framework Security (2002) by LaMacchia et al., chapter 4.*

* cited by examiner

*Primary Examiner*—Joseph E Avellino
*Assistant Examiner*—Patrick Nagel
(74) *Attorney, Agent, or Firm*—Lee & Hayes, PLLC

(57) ABSTRACT

Various embodiments provide a standardized way to interact with and extend instant messaging applications. A platform is provided and enables developers and other third parties to create extensions for instant messaging applications. Through a set of APIs, interacting applications or plug-ins are "sandboxed" in their own areas where they are unable to perform unpermitted or unauthorized actions. The plug-in platform or architecture is integrated with the platform of the instant messaging application and can allow developers to create plug-ins that can interact with a local user and their buddies. Any number of various types of plug-ins can be developed and incorporated into the instant messaging application in a standardized manner.

12 Claims, 16 Drawing Sheets

INSTANT MESSAGING PLUG-INS

BACKGROUND

To date, creating applications that interact with, or in some way extend instant messaging applications has been something that has not had an organized or standardized approach. That is, if someone wishes to extend an instant messaging application in some way, one approach has been to reverse engineer the instant messaging application, and then write code to supply whatever feature or functionality is desired. This approach can create problems not only for the instant messaging application, but for other applications and resources that might be running or available locally.

SUMMARY

Various embodiments provide a standardized way to interact with and extend instant messaging applications. A platform is provided and enables developers and other third parties to create extensions for instant messaging applications. Through a set of APIs, interacting applications or plug-ins are "sandboxed" in their own areas where they are unable to perform unpermitted or unauthorized actions. The plug-in platform or architecture is integrated with the platform of the instant messaging application and can allow developers to create plug-ins that can interact with a local user and their buddies. Any number of various types of plug-ins can be developed and incorporated into the instant messaging application in a standardized manner. In at least some embodiments, the plug-ins can be presented as "agents" or "virtual buddies".

DETAILED DESCRIPTION

Overview

The embodiments described below provide a standardized way to interact with and extend instant messaging applications, such as Microsoft's Windows® Messenger or Windows® Live Messenger. Although the description below is provided in the context of this Microsoft product, it is to be appreciated and understood that other instant messaging applications can be employed without departing from the spirit and scope of the claimed subject matter.

In the embodiments about to be described, a platform is provided that enables developers and other third parties to create extensions for instant messaging applications. Through a set of APIs, interacting applications are "sandboxed" in their own areas where they are unable to perform unpermitted or unauthorized actions. In the context of this document, these extensions or interacting applications are described as "plug-ins".

In the illustrated and described embodiments, the plug-in platform or architecture is integrated with the platform of the instant messaging application and can allow developers to create plug-ins that can interact with a local user and their buddies. In at least some embodiments, the plug-ins can be presented as "agents" or "virtual buddies", as will become apparent in the description below.

The architecture described below is extensible to allow hosting models of different types. In the particularly described example, the architecture is implemented leveraging use of Microsoft's .NET Framework as the hosting platform. This hosting platform is publicly well documented and, for this reason, specific details are omitted. It is to be appreciated and understood that the described architecture can be implemented using different platforms, such as a scripting platform, a gadgets or widgets platform, or a COM platform, to name just a few.

Exemplary Environment

Figure 1:
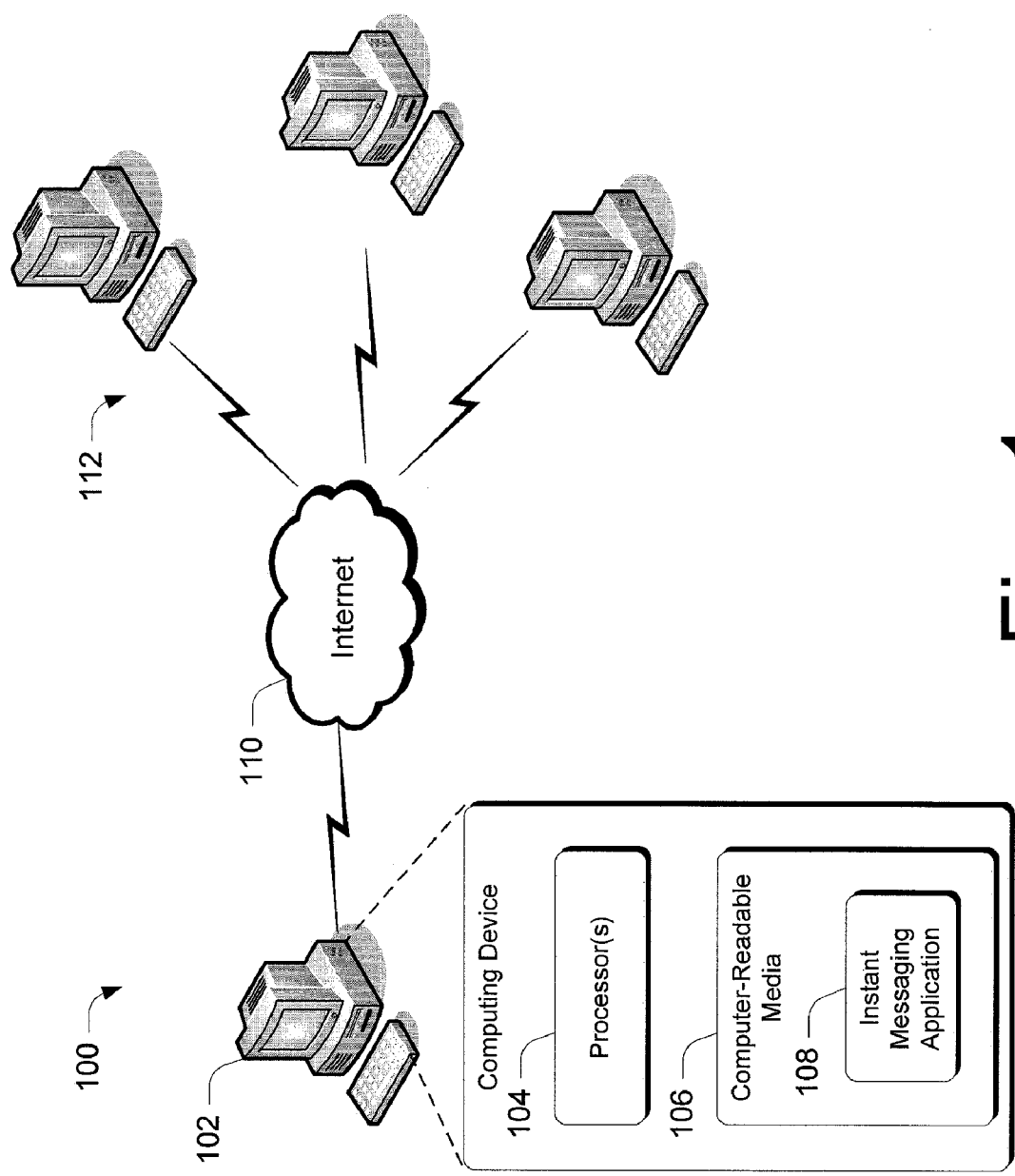
FIG. 1 illustrates an exemplary environment in which the inventive embodiments can be employed in accordance with one embodiment.

FIG. 1 illustrates an exemplary environment in which the inventive embodiments can be employed generally at 100.

Here, system 100 includes one or more computing devices in the form of a client computing device 102 and one or more other computing devices shown generally at 112. The computing devices communicate with one another via a network such as the Internet 110. In this example, the client computing devices comprise, as shown by computing device 102, one or more processors 104 and one or more computer-readable media 106 on which executable, computer-readable instructions reside. In this example, computer-readable media 106 includes code that implements an instant messaging application 108 as well as the platform or architecture that is described below.

Generally, instant messaging applications allow users to instantly communicate and collaborate with what are termed their "contacts" or "buddies". A user can build a list of contacts or buddies by providing a friendly name such as "Paul" and an address. Instant messaging applications utilize the notion of "presence", which makes instant communication and collaboration with contacts even more effective. Presence gives users the ability to find each other and stay constantly updated with each other's online status. The powerful capabilities of presence are usually provided by a server or service, as will be appreciated by the skilled artisan. In addition, instant messaging applications can provide or allow a person to create a personal expression or identity. For example, a person can not only be represented by a name, but can also have a user tile or icon and a personal status message. In at least some of the embodiments described below, plug-ins can have an identity or personal expression that can be applied to the local user and therefore these personal expression attributes can be changed in a more automated/programmatic fashion.

The protocol used for initialization and communication on an instant messaging session depends upon the server or service being used. For example, text can be carried over a TCP connection, a TCP UDP or Secure Sockets Layer (SSL), to name just a few. Typically, an initiating client sends a request to start a conversation with the contact to the server, which is then forwarded to the other client. The instant messaging communication can then proceed. Specifically, message text can now be sent to the server and forwarded to the other client. How the message text is delimited depends upon the server and protocols being used. In some systems, text is sent using a Hypertext Transfer Protocol (HTTP) or Extensible Markup Language (XML) in HTTP message encapsulated in the TCP connection with the server. Other features that instant messaging applications can provide include, by way of example and not limitation, voice and video calls, application sharing and file transfer, all of which will be appreciated by the skilled artisan.

It is to be appreciated and understood that while the computing devices above are illustrated as desktop devices, such devices can take other forms such as laptop or notebook computers, handheld computers, or any other type of computing device that can be used in connection with instant messaging functionality.

Exemplary Instant Messaging Application

Figure 2:
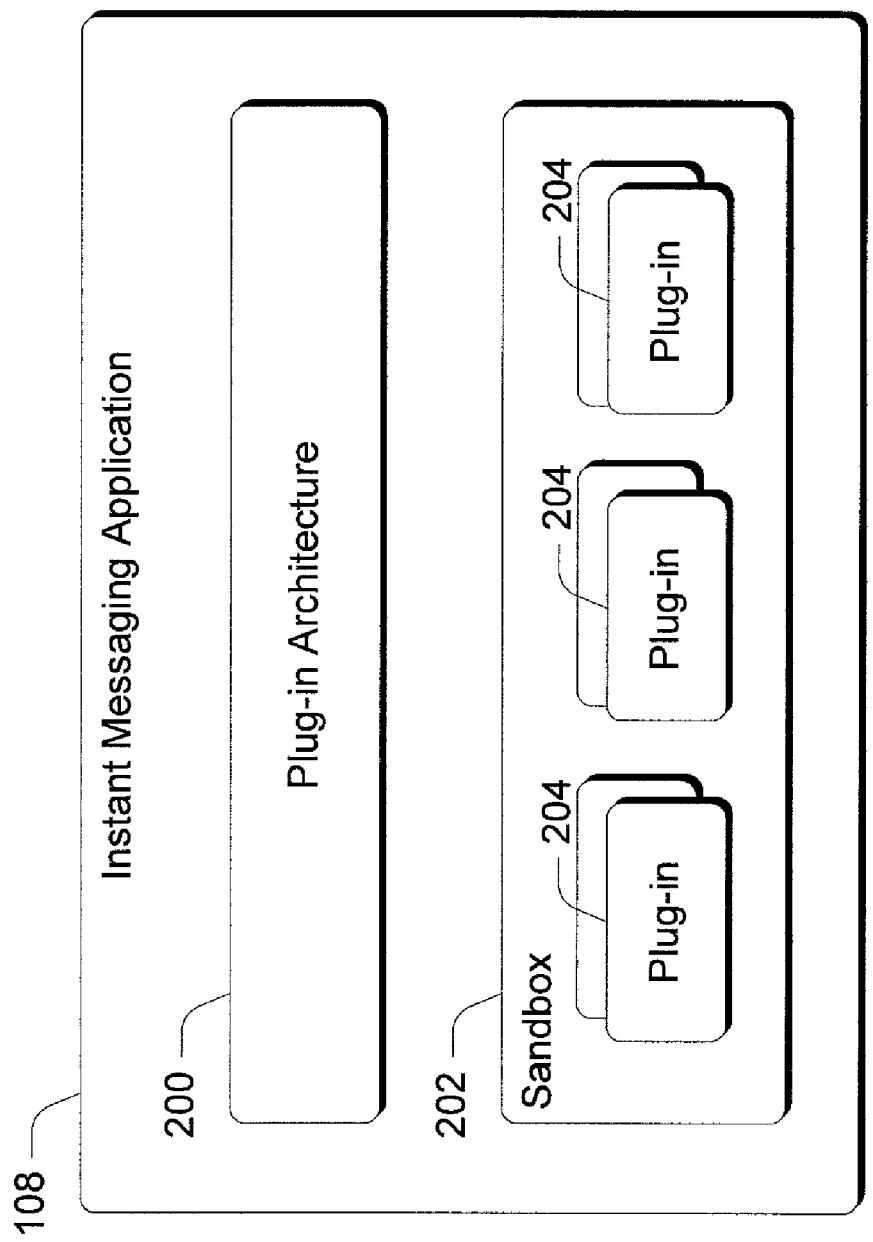
FIG. 2 illustrates an instant messaging application in more detail in accordance with one embodiment.

FIG. 2 illustrates instant messaging application 108 in more detail in accordance with one embodiment. In this particular example, application 108 includes or supports a plug-in architecture 200 and a sandbox mechanism 202 that permits various different types of plug-ins 204 to be plugged in and function with the instant messaging application.

The plug-in architecture 200 can allow developers, such as third party developers, to develop these plug-ins that extend instant messenger applications, while at the same time provide a degree of security which, in effect, sandboxes the plug-ins to prevent the plug-ins from behaving in unauthorized or undesirable ways. More specifically, the described architecture can provide an environment in which a plug-in, typically in one embodiment in the form of a DLL or .Net compatible assembly can be loaded inside the environment's processor space and, based on an API set and various applicable rules, the DLL's functionality can be circumscribed to provide a degree of security to other applications and system resources.

In embodiments that leverage the .NET hosting platform, the sandbox is implemented using .NET's Code Access Security (CAS) which is well documented and described in additional detail below.

In accordance with at least some embodiments, different types of plug-ins 204 can be provided. For example, plug-ins in the form of personal bots or agents can be provided to impart some type of extended functionality to the messenger application. Specific examples are provided below in a section entitled "Use Scenarios".

In at least some embodiments, a plug-in itself can be represented as a unique identity. Specifically, there are a number of attributes attached to an identity in an instant messaging application including, by way of example and not limitation, a friendly name, a user file, a personal status message and the like. Plug-ins themselves can programmatically specify each of these attributes, along with other items such as a description. In at least some embodiments, these identity attributes can also be changed at any time.

Preliminarily, however, consider the following. In at least one embodiment, users can interact with a plug-in in two different ways. That is, the plug-in can be configured as an agent or as a virtual buddy.

When the local user specifies one of the installed plug-ins as their agent and the agent has been turned on, this plug-in's identity temporarily overrides the local users' identity. This essentially exposes the plug-in to other contacts that have the local user as a buddy. The plug-in has its own user tile, personal status message (PSM), and other similar properties that are then applied to the local user's properties. The plug-in, in this configuration, can also send messages to buddies on the local user's behalf. This type of plug-in can, for example, allow the user to define a deep and rich personal expression, as well as an away message that they can specifically tailor and configure accordingly to fit their own parameters. In addition, in at least some embodiments, when a plug-in changes its identity at any point in time which the plug-in is turned on, the instant messaging application will update the local user's identity and propagate the changes through its network.

A plug-in can also be utilized as a virtual buddy. In this case, all installed plug-ins will also appear in the buddy list area of the messaging application. This provides a way for the local user to interact with a plug-in for their own entertainment, rather then exposing the plug-in to their buddies. In this case, the plug-in's identity properties (such as its user tile and personal status message) will be displayed in the normal way these items are displayed for other real contacts.

In at least some embodiments, all plug-ins should be end-user customizable (i.e., they should have their own options dialog). With the notion of end-user customization, consider briefly some other scenarios in which plug-ins can be used.

A plug-in can be configured as a personal assistant. Here, the plug-in can do such things as integrate with email, calendar and voice mail applications to, for example, schedule meetings, update the user's tile to reflect their current status, interpret incoming messages and send responses to buddies detailing the next time a particular user is free, negotiate between schedules and find non-conflicting solutions, perform answering machine-type functionality, and prepare and send different responses based on the sender of an incoming message.

A plug-in can be configured with remote control functionality. As such, a plug-in can integrate with webcams and media players (such as to record television shows), perform system administration, configure home lighting systems, and the like. Further, the plug-in can interpret incoming messages allowing the control of these items via the messenger application.

A plug-in can be configured with personal expression capabilities. For example, a plug-in can be configured to enable a slide-show of user tiles or to allow a user to select different tiles based on their mood. Further, the plug-in can interpret outgoing messages and automatically change personal status messages, user tiles, and the like based on keywords in the outgoing message. Further, the plug-in can monitor conversation, remember good quotes to use as custom away messages, or tell jokes or stories that are configured or selected by the end-user.

A plug-in can be configured for entertainment. For example, a richly configured artificial intelligence bot can provide amusement when there is not a real person with whom to talk. Plug-ins can be configured for gaming scenarios, such as pitting two or more bots against each other to see which one can solve a puzzle faster, or pitting two bots against each other in a game to see who wins. A plug-in can be configured as a pet such that a user can raise and interact with the pet, play games with it, let it talk to their buddies, and the like. One specific example is given below in the "Use Scenarios" section.

A plug-in can be configured to provide additional utility. Specifically, a plug-in can add functionality to the messaging application as by providing for blogging, sound, displaying user interface notifications, sending email, searching, and the like. A plug-in can also be configured to provide for different ring tones, spy on buddy status (tagging), or provide question/answer search. A plug-in can be configured as a default help plug-in to perform diagnostics and chat the user through any particular problem with a particular application. This provides more information in conversational context, rather then presenting it in a document. A plug-in can also be configured as a language translator, spell checker and the like.

Needless to say, there are simply innumerable scenarios in which a plug-in can be employed, with the above constituting non-limiting examples of but a few of these scenarios. As will become apparent, the plug-in architecture can enable a very rich and seemingly endless suite of functionality which is really only limited by the creativity of the individual or team developing the particular plug-in. Some of these different types of plug-ins are described in more detail in the section entitled "Use Scenarios" below.

Exemplary Plug-In Architecture

Figure 3:
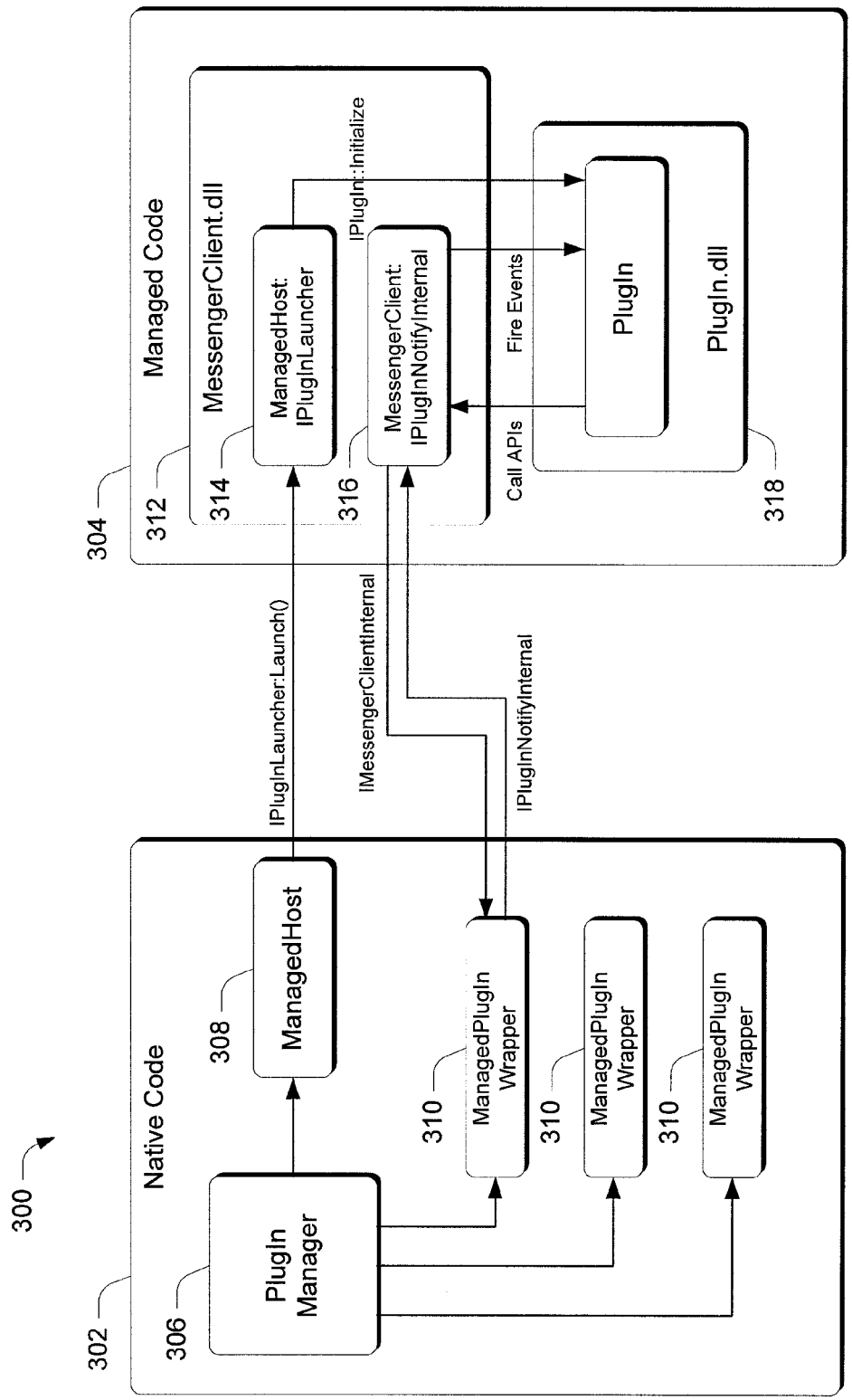
FIG. 3 illustrates an exemplary plug-in architecture in accordance with one embodiment.

FIG. 3 illustrates an exemplary plug-in architecture, generally at 300, in accordance with one embodiment. In the discussion that follows, the architecture described in the context of a managed code environment that is operable to work in connection with native code. In this particular example, the managed code environment refers to code that is running under the .NET runtime environment, as will be appreciated by the skilled artisan. As such, example employs or otherwise leverages some of the .NET managed code functionality which is well documented. It is to be appreciated and understood that the architecture can be implemented outside of the managed code environment and that such constitutes but one example only. In the discussion that follows, first, a brief overview of the architecture as well as some of its functionality is provided. Following this, a more detailed discussion of a particular implementation is provided. In this latter section, a section entitled "Internal Communication Between Managed and Native Code" provides an example of APIs that support the architecture described above and below.

Brief Overview

In this particular example, architecture 300 includes a native code environment 302 and a managed code environment 304.

Native code environment 302 comprises, in this particular example, a PlugIn Manager 306, a ManagedHost 308 and one or more ManagedPlugInWrappers 310. Managed Code Environment 304 comprises, in this particular example, a MessengerClient.dll 312, a ManagedHost 314, a MessengerClient 316, and one or more PlugIn.dll 318.

PlugIn Manager 306 is, in this embodiment, an internal messenger component and manages how the user interface and the rest of the messenger application interacts with the various plug-ins. PlugIn Manager 306 utilizes ManagedHost 308, which essentially provides access to the managed code environment 304 or, more accurately, to a class (ManagedHost 314) in the managed code environment 312 that will do things such as launch new application domains and create new instances of the plug-ins.

Each plug-in 318 in the managed code environment 304 is associated with a native side ManagedPlugInWrapper 310. The native messenger code uses the ManagedPlugInWrappers to ascertain what a particular the plug-in has done—such as to ascertain where a plug-in's identity information has been cached and the like.

In this particular example, communication between the native code and managed code environments 302, 304 is bridged using something known as COM Interop, which is a well-documented .NET framework feature. As such, it is not described here in additional detail.

In operation, the instant messenger application (here referred to as Messenger) launches a new plug-in by calling an interface in the managed code environment 304. The managed code environment 304 loads up the MessengerClient.dll 312 and ManagedHost 308 calls IPlugInLauncher:Launch( ) on ManagedHost 314, which passes in the path name of the assembly that is to be launched. ManagedHost 314 then creates a new application domain and applies some particular permissions on that application domain (e.g., only objects inside MessengerClient.dll are able to run high trust; all other objects run with low trust). In this particular implementation, this security feature is implemented utilizing .NET's Code Access Security (CAS), which is described in more detail below.

Each plug-in, by definition, supports the IPlugin interface. ManagedHost 314 then calls initialize on this interface. When this happens, the plug-in is given a pointer to the MessengerClient 316 so that it can communicate with the messenger application. Effectively then, at this time, the plug-in can subscribe to events using the typical .NET ways, as will be appreciated by the skilled artisan.

Now assume that time goes on and an incoming message is received to which the plug-in has subscribed. The PlugIn Manager 306 notices the incoming event and notifies the ManagedPlugIn Wrapper 310 associated with the current plug-in. Accordingly, ManagedPlugIn Wrapper 310 notifies the MessengerClient 316 in the managed code environment 304 that there is an event and it fires the event to the particular plug-in of interest. MessengerClient 316 communicates with the ManagedPlugInWrappers 310 and with Plug-ins 318 using a set of APIs. The plug-in code can then respond, if appropriate, using an API exposed by the MessengerClient 316.

DETAILED DISCUSSION OF A PARTICULAR IMPLEMENTATION EXAMPLE

Consider now the implementation of architecture 300 in more detail. Specifically, in this example, MessengerClient.dll 312 contains the hosting infrastructure for creating a new application domain, applying Code Access Security (CAS) restrictions to that application domain, and launching the plug-in code to execute in this new application domain. This .dll also contains code for implementing the managed MessengerClient 316 object, which the plug-in 318 has access to and uses to communicate with the messenger application and receive events from the messenger application, as noted above.

In implementation, PlugIn Manager 306 keeps a list of the installed plug-ins, as well as a pointer to a ManagedPlugInWrapper 310 for those plug-ins that have been loaded or are in the process of being loaded. Even though all plug-ins may be loaded, it is only when one of the plug-ins is specified as an Agent and turned on that a plug-in is notified of events. Similarly, an Agent plug-in can be loaded, but turned off. In order to display the plug-in name (used by most of the user interface components), the plug-in must, in this embodiment, be loaded. In accordance with this embodiment, an individual plug-in may be in the following states:

Not Loaded: No plug-in user code has been run. In this state, there is no knowledge of any identity information about the plug-in such as its name, or capabilities;

Loaded, 'Off': The plug-in is currently running in its own AppDomain and IPlugIn::Initialize has been called, but it is idle. The plug-in is not able to respond to events, and the plug-in identity does not affect the local user's identity.

Loaded, 'On': Only the currently selected 'Agent' can be in this position, and only one plug-in at a time may be in state (unless the concept of running plug-ins as virtual buddies is supported). When in this state, the plug-in may receive events, send messages, and the plug-in's identity will override the local user's identity, allowing the plug-in to affect the local user's personal status message (PSM) and user tile.

In at least some embodiments, once a plug-in is loaded, it is not unloaded until the user signs out or there has been a problem with the plug-in such as an unhandled exception. Using the user interface, the local user may toggle the state of a plug-in between 'on' and 'off' in order to control whether the plug-in has any real effect on things. The distinction between an 'on' and 'off' plug-in is implemented inside the PlugInManager 306. In order to turn a plug-in on, the manager adds the IMsgrUser associated with the local user to the plug-in wrapper, thus signaling the plug-in wrapper to apply the plug-in's identity to that user.

Code Access Security (CAS)

Consider now the following discussion on Code Access Security (CAS). In embodiments that employ CAS, the architecture of the plug-in model utilizes the .Net framework to isolate the running of plug-ins within their own Security context of the .Net framework. This framework is invoked with Code Access Security restrictions. In this embodiment, the zone which is used to protect the system from misbehaving plug-ins is the Internet security zone. This zone is the most restrictive default zone within which a user can run a plug-in. This is the zone given to all plug-ins by default. It is possible, however, for users to have more granular control of what particular plug-ins can do. For example, the Security restrictions can be extended to allow plug-ins to perform more tasks depending on the permissions the Messenger service wants to allow. These restrictions can be facilitated by Allow/Deny lists, or can be set via digital certificates, as will be appreciated by the skilled artisan.

In the illustrated and described embodiment, the sandbox that is created allows the plug-ins the following privileges and restrictions:

Create "safe" user interface elements (non-transparent);
Get access to the file system and printers with user consent and store a limited amount of data in isolated storage;
Prevented from reading random parts of the file system or registry, or environment variables;
Prevented from creating web connections outside its "site of origin";
Prevented from making COM calls or calls to exported functions in managed code; and
Non-Public Reflection Internal Communication Between Managed and Native Code In accordance with the implementation example above and as illustrated in FIG. 3, three COM interfaces are provided to support this particular plug-in framework:

IPlugInLauncher;
IPlugInNotifyInternal; and
IMessengerClientInternal.

These interfaces are used in order to communicate with managed code (and allow managed code to communicate with native messenger) by taking advantage of COM Interop, as noted above. In this particular implementation example, none of these interfaces are exposed to the external developer, but are instead wrapped by the MessengerClient object 316.

IPlugInLauncher is implemented by the ManagedHost 314 and called by native messenger in order to create a sandboxed AppDomain, and launch the plug-in.

IPlugInNotifyInternal is implemented by managed MessengerClient 316 and called by native messenger in order to notify the plug-in of an event or to extract information (such as current capabilities) from the plug-in.

IMessengerClientInternal is implemented by the native ManagedPlugInWrapper 310 and called by managed code in order to implement various-managed APIs (such as a get/set SavedState property).

In this implementation, the interfaces are internal COM interfaces that cross the boundaries between managed and native code.

Exposed Managed API

The following discussion describes an exemplary exposed managed API in the managed code environment 304 of FIG. 3, in accordance with one embodiment. It is to be appreciated and understood that the managed APIs that are described below constitute but examples which are not intended to limit application of the claimed subject matter. Rather, other additional or different APIs can be utilized without departing from the spirit and scope of the claimed subject matter.

MessengerClient.IncomingMessage Event

This event is fired when a plug-in is receiving a text message (for example, it is running as the 'Agent' of the local user and a buddy sends the local user a message). The event gives the plug-in access to both the user the message is from, as well as the contents of the message. The plug-in is allowed to send one message (of each type—text, nudge, action) as a response.

MessengerClient.OutgoingMessage Event

This event is fired when the local user is sending a text message to a buddy and gives the plug-in access to both the user the message is going to, as well as the contents of the message. The plug-in is allowed to send one message (of each type—text, nudge, action) as a response. The plug-in can also cancel this outgoing message so that it is never sent. If the outgoing message does not begin with a '/', then an error will be shown to the local user so they are aware that the plug-in caused their message not to be sent. In all cases where the message is canceled (begins with a '/' or not), the canceled message will not appear in the conversation window or be part of the conversation history.

MessengerClient.Shutdown Event

This event is received when the client is unloading the plug-in. The plug-in can use this event to save the plug-in state. This can happen in the following cases: when the clients state changes to online in the case of an Away message; when the client is shutting down; when the client is uninstalling a plug-in; when the client logs off the current user; or when the client changes the currently selected Agent plug-in.

MessengerClient.ShowOptionsDialog Event

This event is fired when the user chooses to configure the plug-in. The plug-in can use this event to show their own options dialog. If the plug-in has nothing it wishes to allow the end user to configure, then it should not override this event.

MessengerClient.LocalUserStatusChanged Event

This event is fired when the local user's status changes.

MessengerClient.BuddyStatusChanged Event

This event is fired when a contact's status changes and gives the plug-in access to information about the buddy who's status has changed.

IPlugIn::Initialize

A plug-in must implement the IPlugIn interface (and this method). A plug-in should subscribe to all the events it wishes to handle during its lifetime before returning from its Initialize implementation. For example, if the plug-in ever wants to handle incoming messages, it should subscribe to the MessengerClient.IncomingMessage event. A plug-in should apply its initial identity information (especially its name), by setting the MessengerClient.PlugInIdentity property. This method is called when the plug-in is loaded, under the following cases: when the status changes to a state other than online or offline in the case of an Agent plug-in; or when the show options is called if the plug-in is not already loaded.

MessengerClient.SendMessage Method,
This method provides support for a text, nudge, and 'Action' message.

MessengerClient.LocalUser property
This property gets supports the following: friendly name, email, status, personal status message (PSM), spaceUrl, UniqueID.

Buddy Class
This class gets the following: friendly name, status, personal status message (PSM), spaceUrl, UniqueID, list of groups this buddy is present ins MessengerClient.PlugInIdentity Property
This property sets the following: friendly name, personal status message (PSM), UserTile, status, description, url. The plug-in should call this during its implementation of IPlugIn::Initialize, and at the very least set its name. A plug-in can change its name, or any of this information, by setting this property at any point while it is running.

MessengerClient.SavedState (Get & Set)
This is called by a plug-in to save information which the plug-in needs to retain between loads and unloads e.g., this could be individual knowledge of specific buddy conversations. In this particular implementation, messenger uses the object store. The object store name corresponding to the file containing the state information is stored in the registry along with the plug-in.

Native Class Description
The following describes aspects and features of a native class implementation in the native code environment 302 of FIG. 3, in accordance with one embodiment.

CPlugInManager Class
This class is the outer-most accessor used by the rest of messenger native code to interact with plug-in related functionality. In this particular example, this class handles the following functionality: installing and uninstalling of plug-ins, plug-in related options and settings, managing the plug-in hosts, managing lifetime of plug-ins, and listening and broadcasting relevant events down to plug-ins.

The public member functions of this class are as follows:
CPlugInManager ( )
~CPlugInManager ( )
DECLARE_EVENT0 (AgentPlugInChanged)
An event that will fire when the user selects a different agent plug-in, or when an agent plug-in gets turned on or turned off, or when the agent plug-in's name or identity changes.
DECLARE_EVENT1 (PlugInIdentityChanged, CString)
An event that will fire when a plug-in sets it's identity information, which can cause it to have a different name, description, etc.
DECLARE_EVENT1 (PlugInCapabilitiesChanged, CString)
An event that will fire when a plug-in is completely loaded and we can detect it's capabilities, or what events the plug-in is currently handling.
HRESULT Initialize ( )
This initializes the Plug-In system.
bool IsPlugInFeatureEnabled ( )
Determines if the plug-in feature is enabled (and isn't shut off for security reasons via shields up, or disabled for some other reason).
bool CanRunManagedPlugins ( )
Attempts to load the .Net runtime and initializes the plug-in system.
HRESULT ShutdownAllPlugins ( )
Shuts down any plug-ins that are currently running.
bool IsAutoAwayPluginEnabled ( )
Specifies whether a selected Agent plug-in will be automatically turned on when the local user's status becomes Away or some other non-online state.
void SetAutoAwayPluginEnabled (bool fEnabled)
Sets the plug-in setting, making it so that a currently selected Agent plug-in automatically turns on when the local user's status becomes Away or some other non-online state.
bool IsAgentPlugInRunning ( )
Returns whether the currently selected agent plug-in is running.
bool IsAgentPlugInSpecified ( )
Returns whether one of the installed plugins is currently set as an Agent.
HRESULT GetCurrentAgentPlugin (CString &strAssemblyPath)
Gets the currently selected Agent plug-in,
HRESULT SetCurrentAgentPlugin (CString strAssemblyPath)
Gets the currently selected Agent plug-in.
VOID TurnOnAgentPlugIn ( )
Turns on (and runs) the currently selected Agent plug-in.
VOID TurnOffAgentPlugIn ( )
Turns off (and stops running) the currently selected Agent plug-in.
HRESULT RegisterManagedPlugin (CString strAssemblyPath)
Installs a managed plug-in.
HRESULT UnRegisterPlugin (CString strAssemblyPath)
Uninstalls a plug-in.
HRESULT GetRegisteredPlugins (CAtlArray<CString>&listRegisteredPlugins)
Retrieves the list of currently installed plug-ins.
bool DoesPlugInShowOptions (CString strAssemblyPath)
Determines if the plug-in is handling the ShowOptions event and is therefore configurable by end-users.
bool DoesPlugInMonitorIncomingMessages (CString strAssemblyPath)
Determines if the plug-in is handling the IncomingMessage event and is therefore able to send message responses.
bool DoesPlugInMonitorOutgoingMessages (CString strAssemblyPath)
Determines if the plug-in is handling the OutgoingMessage event and is therefore able to change outgoing messages before they are sent.
HRESULT ShowPluginOptionsDialog (CString strAssemblyPath)
Shows the plug-in options dialog.
HRESULT GetPluginInfo (CString strAssemblyPath, CString &pluginName, CString &pluginDescription)
Retrieves identity information that the plug-in has published about itself.
HRESULT GetPlugInStateObjectStoreName (CString strAssemblyPath, CStringA &strObjectStoreName)
Retrieves the object store name associated with the object store object that contains this plug-in's saved state.
HRESULT SetPlugInStateObjectStoreName (CString strAssemblyPath, CStringA strObjectStoreName)
Sets the object store name associated with the object store object that contains this plug-in's saved state. Propragates this name to the registry.
VOID OnHostAPICallCompleted (Host_API api, HRESULT hrAPIReturned, CString strAssemblyArg, CComPtr<IUnknown>spRet)
Callback for when a host API call is completed (which was called async (and on another thread).

virtual VOID OnTextReceived (IMsgrIMSession *pIMsgrIMSession, MsgrUser *pBuddy, BSTR bstrMsgHeader, BSTR bstrMessage, VARIANT_BOOL *pfEnableDefault)

If an Agent plug-in is running, this will notify that plug-in that an incoming IM has been received, and the plug-in will be allowed to respond to that M.

HRESULT HandleOutgoingMessage (CAtlArray<CComPtr<IMsgrUser>>&spBuddyToList, CComPtr<IMsgrIMSession>spIMsgrIMSession, LPCWSTR pwszUserName, LPCWSTR pwszBuffer)

This handles notifying the plug-in of an outgoing message (which includes possibly canceling the message from being sent.

virtual void OnLocalStateChangeResult (HRESULT hr, MSTATE PrevState, MSTATE NewState)

Monitors the state of the local user and stops/starts the Agent plug-in according to the plug-in settings. Also fires the LocalUserStatusChanged event for an active Agent plug-in.

virtual void OnUserStateChanged (CComPtr<IMsgrUser>spBuddy, MSTATE PrevState, MSTATE bsCurState)

If an Agent is running, this notifies the plug-in of buddy status changes.

virtual void OnServiceLogoff (HRESULT hrLogoff, CComPtr<IMsgrService>spService)

If we logoff, then we'll shutdown all plug-ins.

The static public member functions of this class are as follows:

static VOID CALLBACK HelpCallback (LPHELPINFO pHelpInfo)

Handles when the user clicks on our help button on the unhandled exception message box.

CManagedPlugInWrapper Class

This class acts as a bridge between the managed and native code environments and encapsulates the interaction between a managed .NET plug-in and the rest of messenger. In the illustrated and described embodiment, a single instance of this class corresponds to a single instance of a running plug-in. In at least some other embodiments, a plug-in can apply its identity to more than one user, such as in a 'fake buddy' and an 'Agent' context. There can also be cases in which no messenger identities are associated with the running plug-in (such as when its information is displayed in the options dialog).

This class implements IMessengerClientInternal, which is a COM interface that the managed MessengerClient object 316 will call into. Thus, MessengerClient 316 is a managed object that messenger implements, which exposes APIs to managed plug-ins. IPlugIn is the interface that a managed plug-in implements.

With regard to references, MessengerClient 316 holds onto a CManagedPlugInWrapper corn pointer, and IPlugIn; CManagedPlugInWrapper 310 holds onto MessengerClient 316; CPlugInManager 306 holds onto CManagedPlugInWrapper 310 via a map containing CPlugInAssemblyInfo.

When a shutdown event occurs: MessengerClient 316 releases its reference to CManagedPlugInWrapper 310; CPlugInManager 306 releases its reference to CManagedPlugInWrapper 310; CManagedPlugInWrapper 310 becomes freed, releasing its reference to MessengerClient 316; and MessengerClient 316 becomes freed, along with the plug-in object(s).

The public member functions of this class are as follows:
CManagedPlugInWrapper ( )
~CManagedPlugInWrapper ( )

DECLARE_EVENT3 (UnhandledException, CString, PlugIn_API, HRESULT)

An event that will fire when a unhandled managed exception occurs in the plug-in.

DECLARE_EVENT1 (PlugInIdentityChanged, CString)

An event that will fire when this plug-in's identity changes.

VOID SetPlugInAssembly (CSting strAssembly)

This lets the plug-in wrapper know which plug-in it is going to be running. Many interactions with CPlugInManager will require knowing the assembly that this wrapper represents.

HRESULT OnPluginLaunched (IUnknown *spNotify)

This initializes the plug-in wrapper.

CString GetName ( )

Retrieves the plug-in name, or a default name if the plug-in never set this portion of its identity.

CString GetPSM ( )

Retrieves the plug-in personal status message (PSM), or an empty string if the plug-in never set this portion of its identity.

CString GetDescription ( )

Retrieves the plug-in description, or an empty string if the plug-in never set this portion of it's identity.

CString GetUrl ( )

Retrieves the plug-in url link, or an empty string if the plug-in never set this portion of it's identity.

CStringA GetUserTile ( )

Retrieves the object store name associated with a user tile, or an empty string if the plug-in never set this portion of it's identity.

bool IsPlugInCapable (PLUGIN_CAPABILITIES capToTest)

Determines if the given capability is going to be used by this plugin (ie. if the plug-in has subscribed to the given event).

HRESULT ShowOptionsDialog ( )

Notifies the plug-in that the end user has requested to see it's options dialog.

HRESULT StatusChanged (IMsgrUser *pMsgrUser)

Notifies the plug-in that the status has changed for a user (either local user or buddy.

HRESULT ProcessIncomingMessage (CString strMessage, CComPtr<IMsgrUser>pMsgrUserFrom, CComPtr<IMsgrUser>pMsgrUserTo, CComPtr<IMsgrIMSession>pMsgrIMSession)

Notifies the plug-in that an incoming IM was received and retrieves the response message from the plug-in.

HRESULT ProcessOutgoingMessage (CAtlArray<CComPtr<IMsgrUser>>&spBuddyToList, CComPtr<IMsgrIMSession>spIMsgrIMSession, LPCWSTR pwszUserName, LPCWSTR pwszBuffer)

Notifies the plug-in that an outgoing IM occurred and retrieves the response message from the plug-in.

HRESULT Shutdown (bool fNormalShutdown)

Notifies the plug-in that it should shutdown.

HRESULT AddIdentity (IMsgrUser *pUser)

Adds a messenger identity to this plug-in. The plug-in identity information will be applied to this identity.

HRESULT RemoveIdentity (IMsgrUser *pUser)

Removes a messenger identity from this plug-in.

virtual HRESULT STDMETHODCALLTYPE SetPlugInIdentity (UserInternal *user)

Called by managed code to apply new plug-in identity information.

virtual HRESULT STDMETHODCALLTYPE GetLocalUser (UserInternal *user)

Called by managed code to retrieve local user identity information.

virtual HRESULT STDMETHODCALLTYPE GetSavedState (BSTR *state)

Called by managed code to retrieve plug-in state information.

virtual HRESULT STDMETHODCALLTYPE SetSavedState (BSTR state)

Called by managed code to set plug-in state information,

HRESULT SendMessageFromPlugIn (IMsgrUser *pMsgrUser,

IMsgrIMSession *pMsgrIMSession, MessageInternal &msgResponse)

Sends a message (text or nudge or both).

VOID OnPlugInAPICallCompleted (PlugIn-API api, HRESULT hr,

CComPtr<IMsgrUser>spMsgrUser,

CComPtr<IMsgrIMSession

>spMsgrIMSession, CRefCountedPtr<

CRefCountedMessageInternal>spMsg)

Callback for when a plug-in API call is completed (which was called async (and on another thread).

The static public member functions for this class are as follows:

static HRESULT InitializeUserInternal (IMsgrUser *pMsgrUser, UserInternal *pUser)

Initialize a UserInternal structure based on a particular IMsgrUser.

static VOID FreeUserInternal UserInternal *puser)

Initialize a UserInternal structure based on a particular IMsgrUser.

CManagedHost Class

This class manages the native hosting portion of running managed .NET code inside the messenger process. The public member functions of this class are as follows:

HRESULT Initialize ( )

Loads up the .net runtime, and loads the managed portion of the hosting infrastructure inside the default appdomain.

HRESULT LaunchUserCode (PlugInAssemblyInfo &ai)

Launches the managed plug-in assembly containing user code.

HRESULT ShutdownUserCode (PlugInAssemblyInfo &ai)

Shuts down the managed plug-in assembly.

The protected member functions of this class are as follows:

HRESULT LoadHostUnder11 ( )

Attempts to load up version 1.1.4322 (or compatible) of the net runtime and startup the managed hosting code.

HRESULT LoadHostUnder20 ( )

Attempts to load up version 2.0.50727 (or compatible) of the net runtime and startup the managed hosting code.

The static protected member functions of this class are as follows:

static HRESULT LoadRuntimeDll ( )

Loads mscoree.dll and related exports (CorBindToRuntimeEx).

PlugInAssemblyInfo Struct Reference

This pertains to the structure that encapsulates information about a plug-in assembly. When other types of plugins are hosted, such as gadgets and native plug-ins, this structure can be expanded as necessary or desirable. For example, a native COM plug-in could require a guide to be added to this structure.

The public member functions of this structure are as follows:

PlugInAssemblyInfo ( )

PlugInAssemblyInfo (CString strAssemblyPath,

PluginType type)

The public attributes of this structure are as follows:

CString m_strAssemblyPath

This is the path where the plug-in dll is located.

CStringA m_strObjectStoreNameState

This is the object store name associated with the plug-in state.

PluginType m_type

This is the type of plug-in.

CRefCountedPtr2<CManagedPlugInWrapper>m_sp ManagedPlugInWrapper

This is used to interact with the plug-in and fire events or extract identity information that the plug-in has set.

Exemplary Method

Figure 3A:
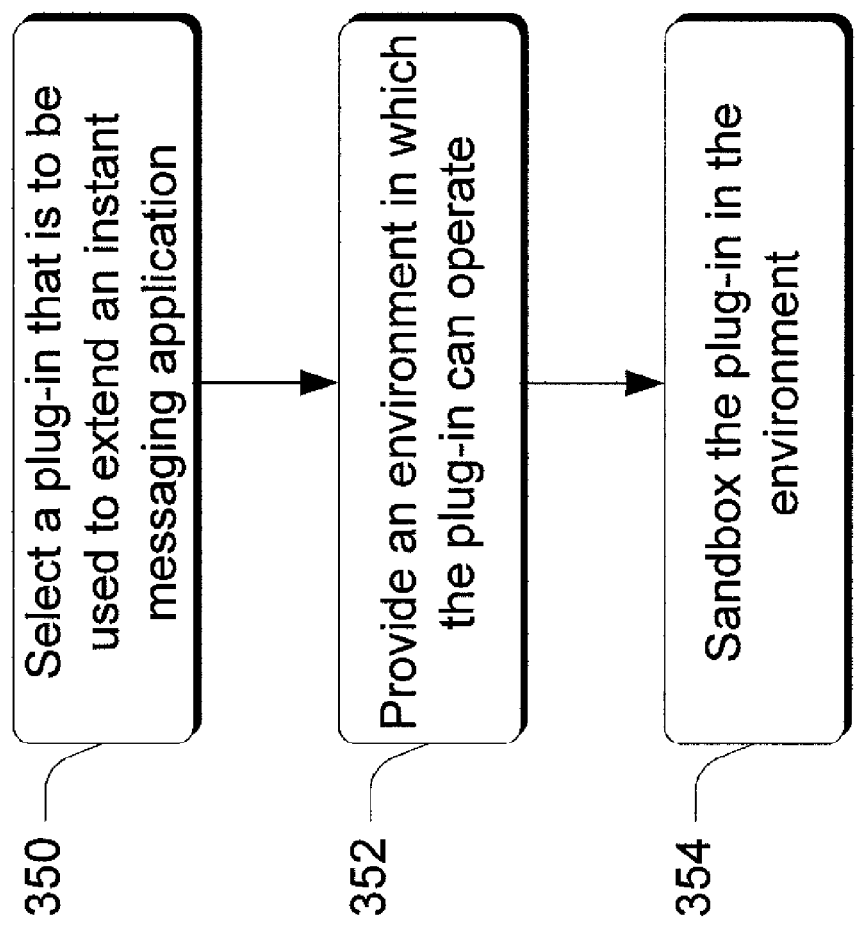

FIG. 3a is a flow diagram that describes steps in a method in accordance with one embodiment. The method can be implemented in connection with any suitable hardware, software, firmware or combination thereof. In at least some embodiments, the method can be implemented using an architecture or platform such as the one described above. It is to be appreciated and understood that the method can be implemented using other systems, architectures and/or platforms without departing from the spirit and scope of the claimed subject matter.

Step 350 selects a plug-in that is to be used to extend an instant messaging application. This step can be performed in any suitable way and can involve any suitable plug-in. For example, the step can be performed responsive to receiving user input to select a particular plug-in, as described below.

Step 352 provides an environment in which the plug-in can operate. This step can be performed in any suitable way using any suitable environment. In the specific example above, the environment in which the plug-in is provided is a managed code environment. As pointed out above, however, such need not be the case.

Step 354 sandboxes the plug-in in the provided environment. This step can be performed in any suitable way, examples of which are given above.

Use Scenarios

To assist the reader in understanding and appreciating how the above-described architecture can be employed, several use scenarios are provided below, some of which were briefly mentioned above. It is to be appreciated and understood that these examples constitute but examples only and are not intended to limit application of the claimed subject matter.

In accordance with the illustrated and described embodiment, there are two sets of scenarios which the plug-in model supports—Developer and Customer scenarios.

Developer Scenarios

A developer who has a set of scenarios which they need to build a plug-in can download a special Software Developers Kit (SDK) that includes the plug-in model. To write their code, the developer can follow a set of instructions such as those described just below.

Figure 4:
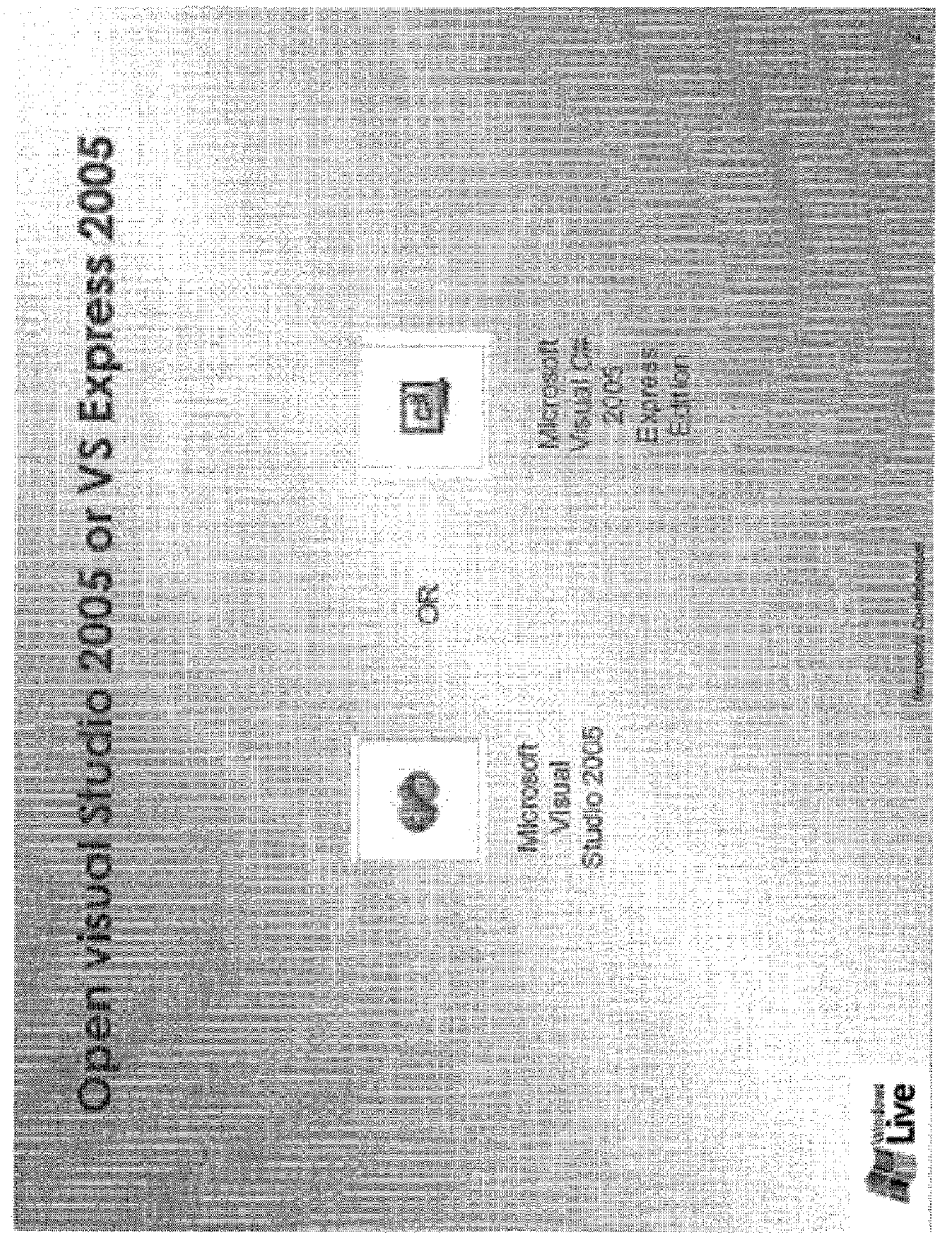
FIGS. 4-10 illustrate one way in which developers can develop plug-ins, in accordance with one embodiment.

First, as indicated in FIG. 4, the developer opens a suitable software application for building their plug-in. One such user interface is shown in FIG. 4.

Figure 5:
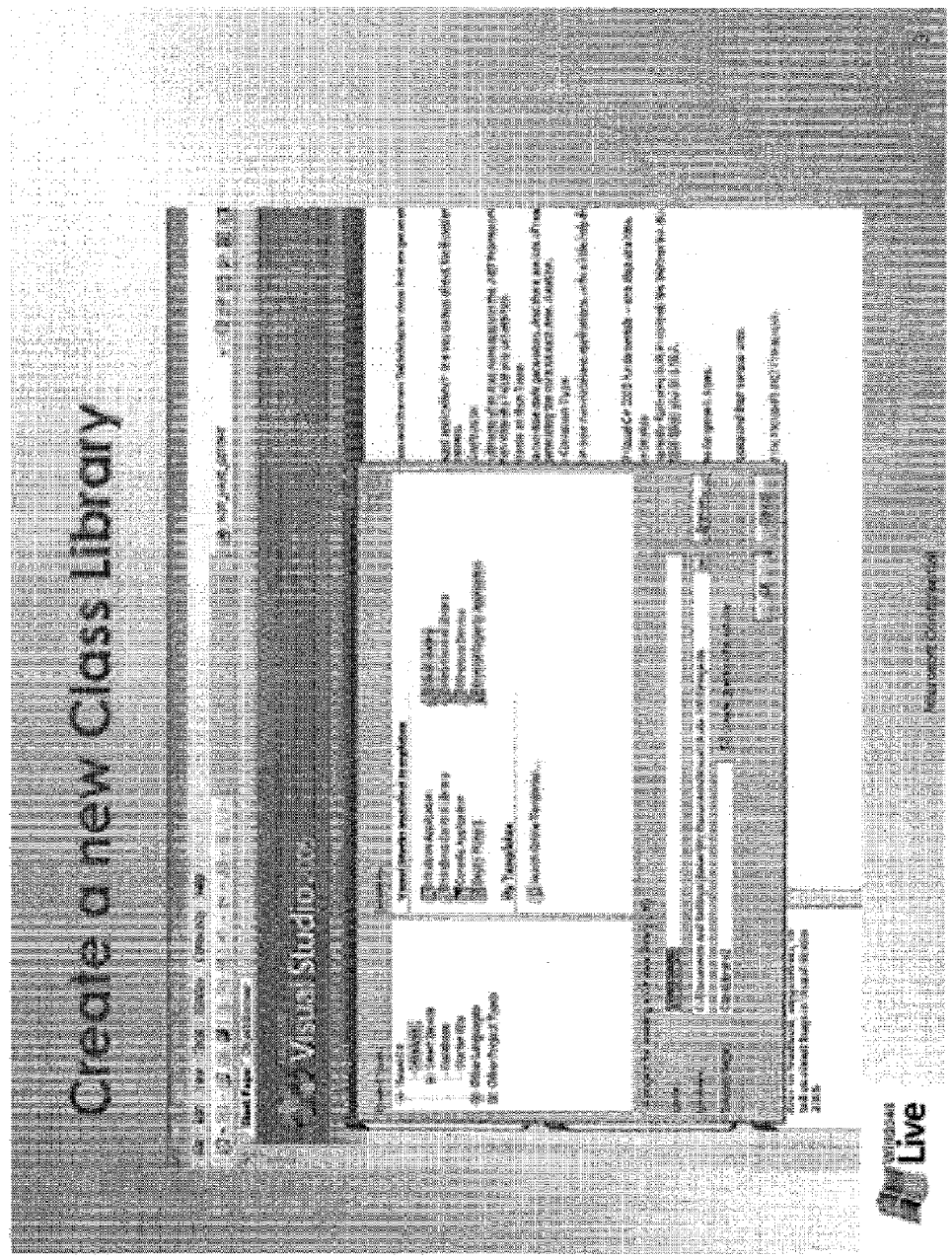
Figure 6:
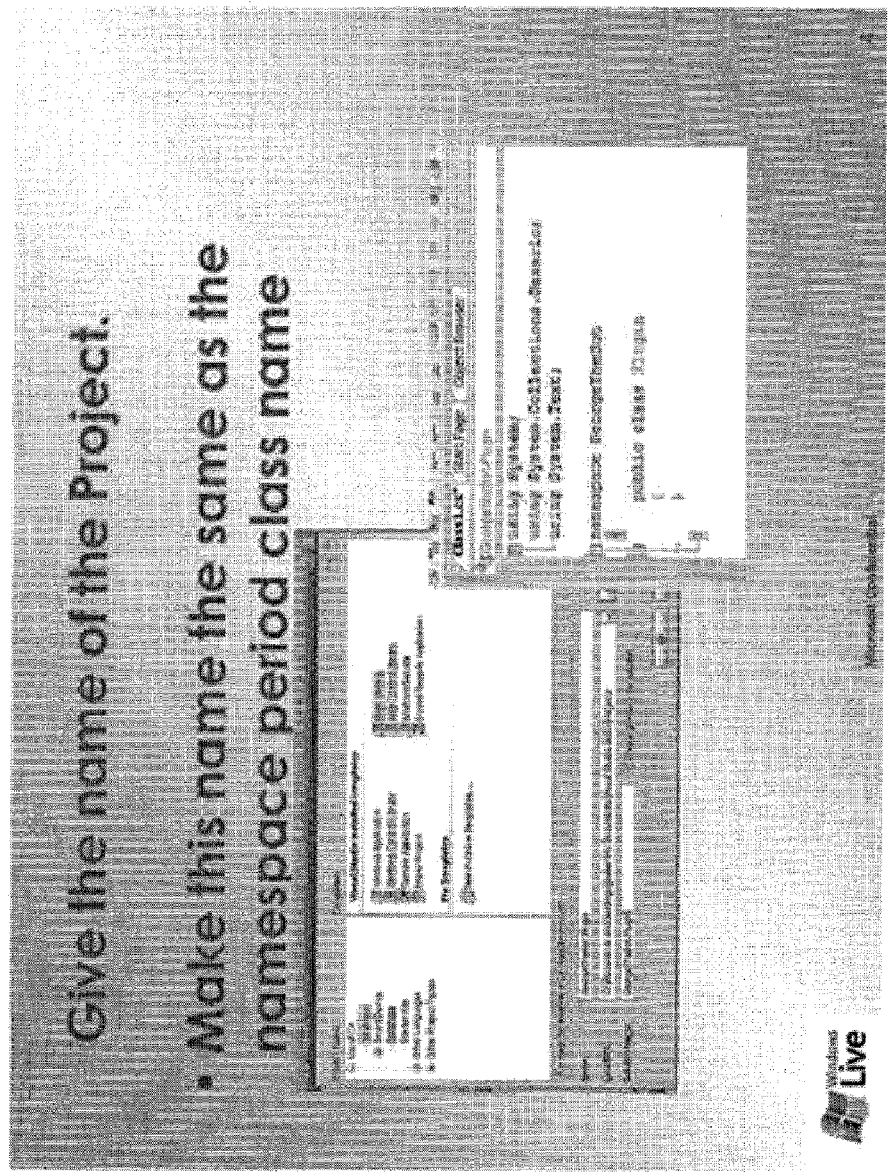
Figure 7:
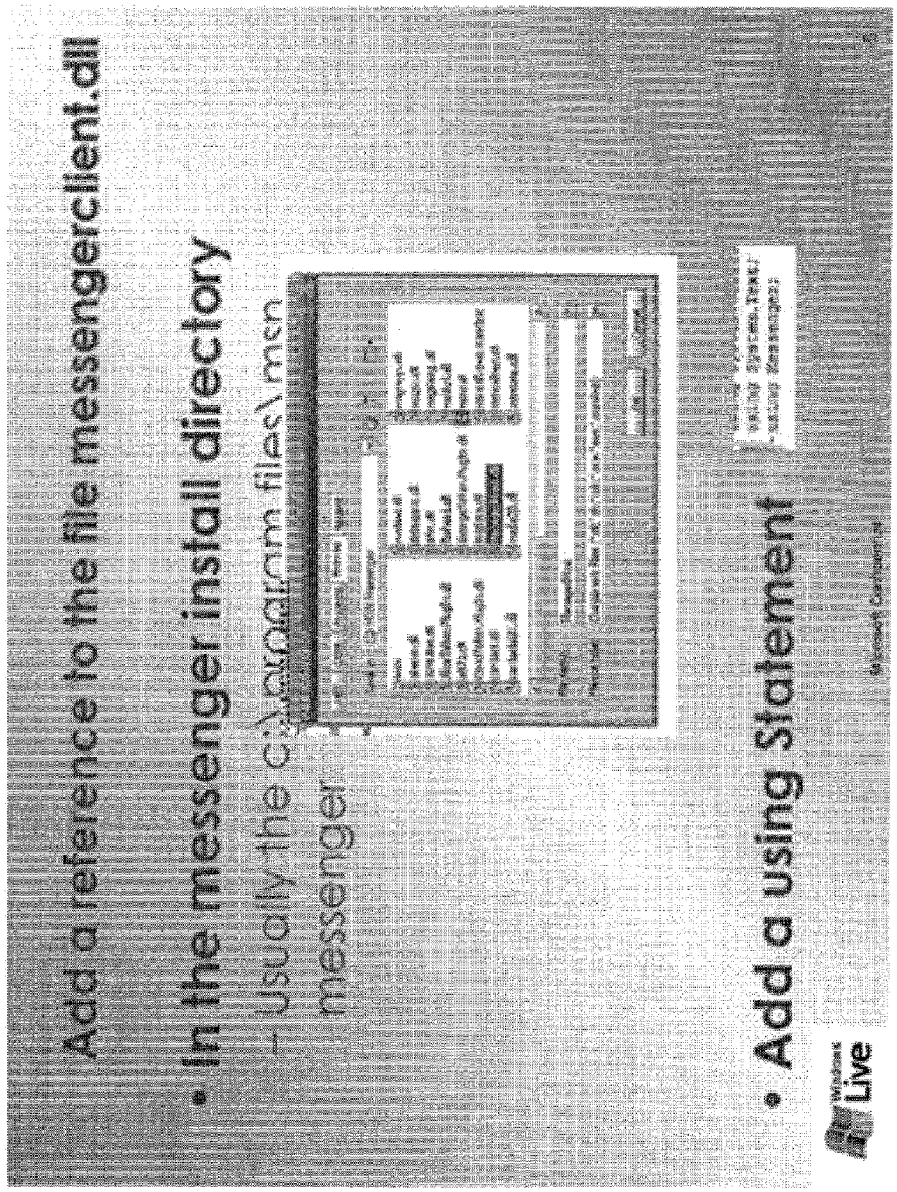
Figure 8:
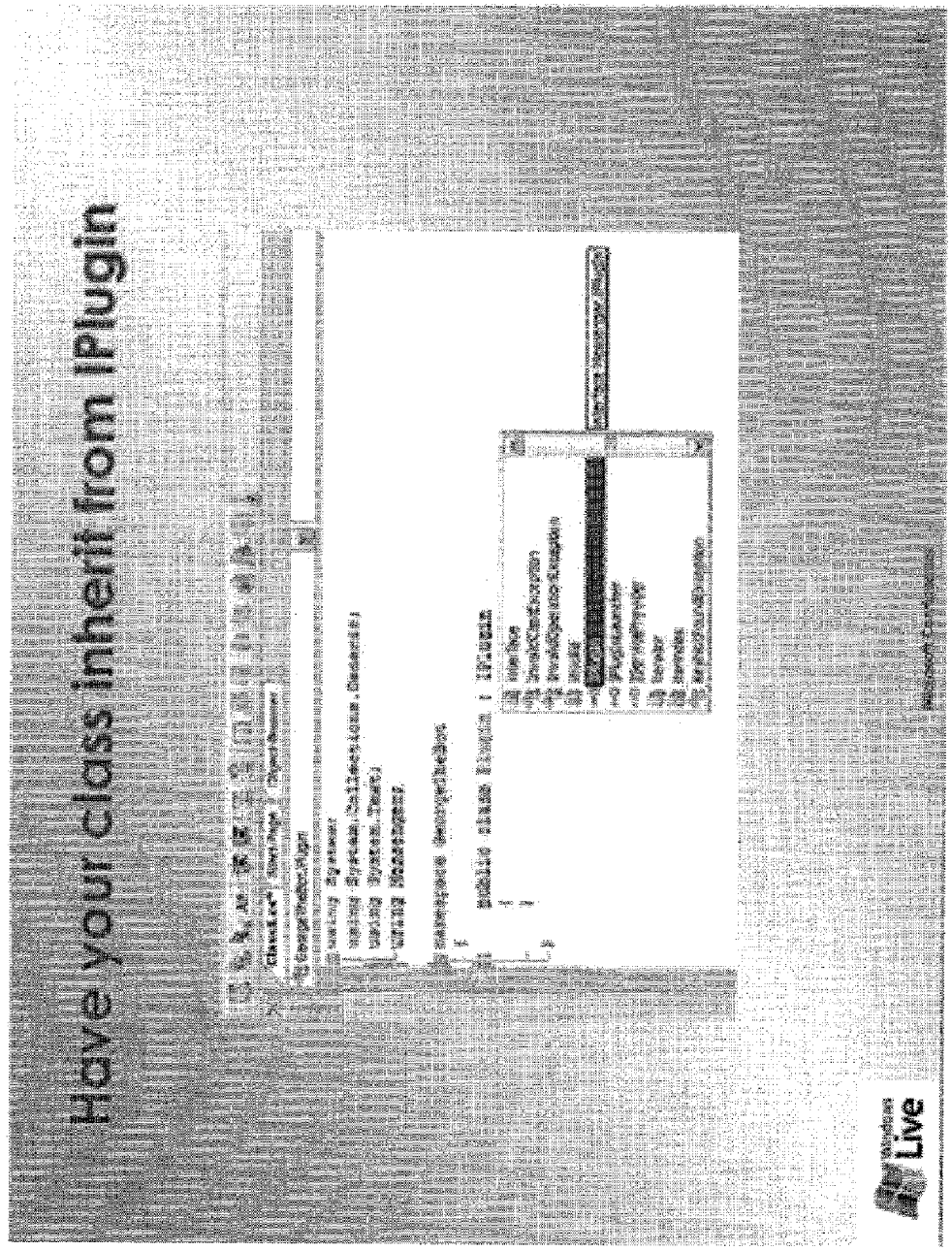
Figure 9:
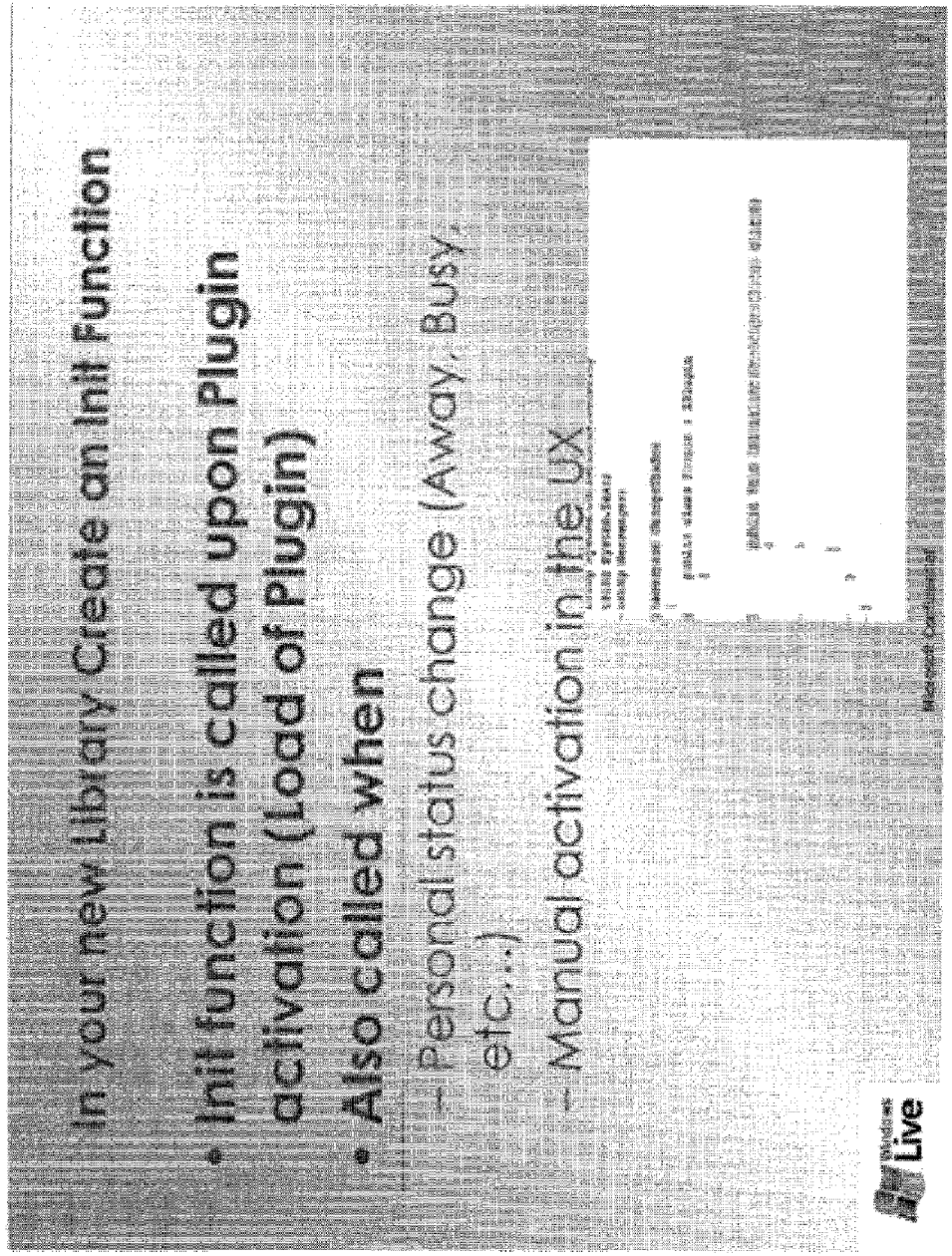
Figure 10:
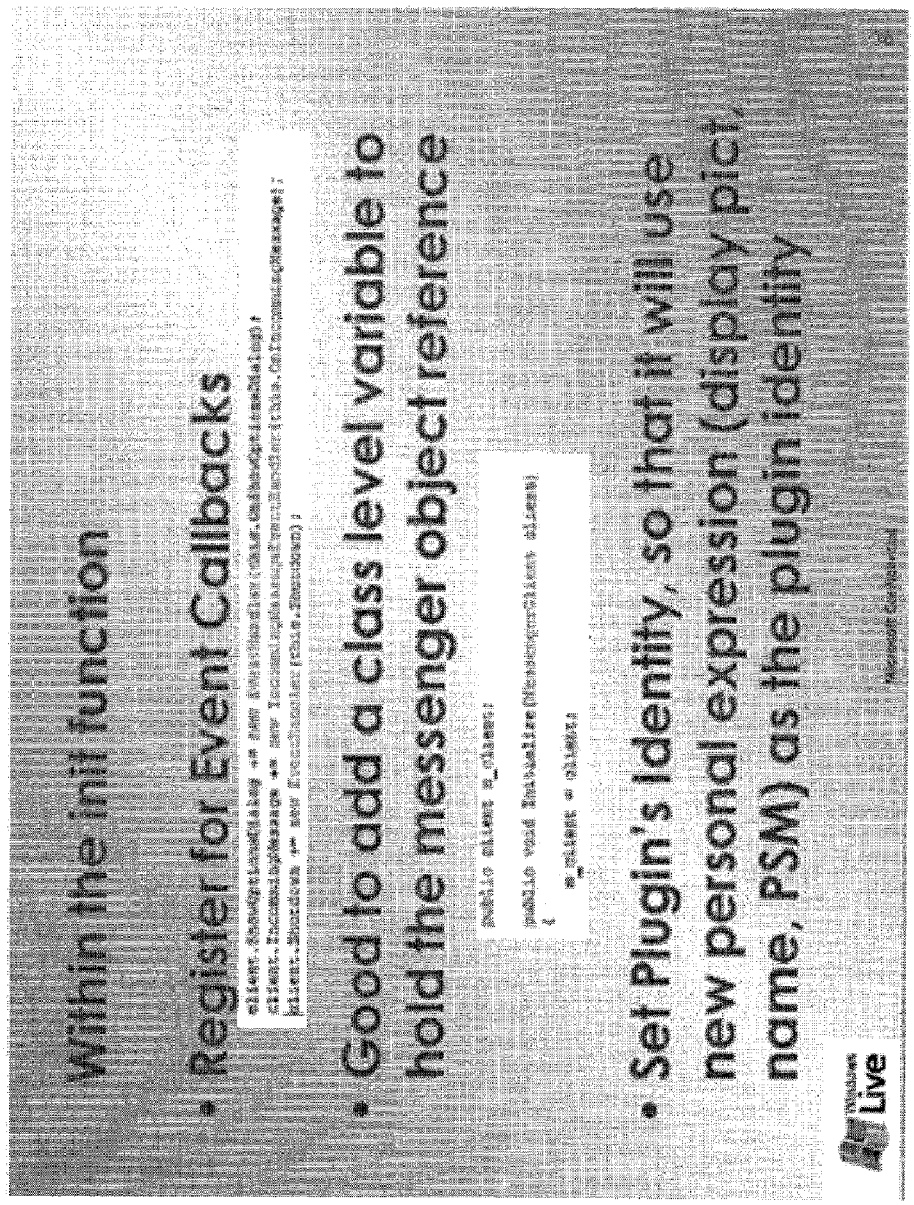

Next, as indicated in FIG. 5, the developer can create a new class library. Next, as indicated in FIGS. 6 and 7, the developer can give their project a name and add a reference to the file messengerclient.dll. Following this, the developer can, as indicated in FIGS. 8 and 9, have their class inherit from IPlugIn and create an Init Function. Next, as indicated in FIG.

10, the developer can configure the Init function in different ways such as registering for event callbacks, adding class level variables to hold the messenger object reference and the like.

The developer can now write code within their particular functions for a plug-in. For example, the developer might write code to play a personal ring tone when a status change event occurs for one of the local user's buddies, or allow the end user to choose or specify a particular away message for each group, or change the plug-in's user tile to a different image depending on the time of the day using an embedded bitmap, send nudges, change personal status messages (PSM) such as adding a link to a bot's download, or change a display name to add a display name indicating that a user's bot is in charge, to name just a few.

Customer Scenarios

The scenarios of the customers connect with the developer scenarios since the developers will produce the code that enables the customer scenarios. In this particular example, there are two end user ways to interact with a plug-in—the virtual buddy and the agent plugin. The scenarios for both of the types are described below.

Before being exposed to a plug-in's functionality, a user or customer will typically have to install a plug-in. The discussion below provides but one example of how a customer or user can select and install a plug-in.

Figure 11:
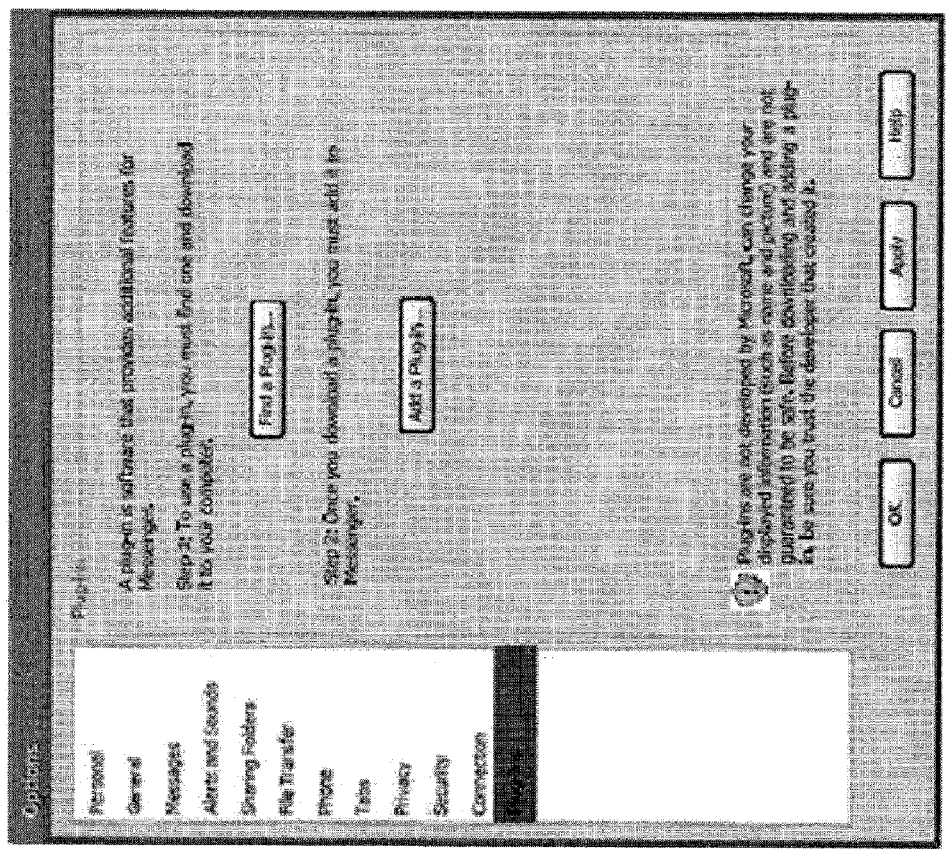
FIGS. 11-15 illustrate various user interfaces that a user is presented when they select and install a plug-in in accordance with one embodiment.

FIG. 11 illustrates the user interface that is displayed when there are no plug-ins installed. There are a number of tabs that comprise this interface: Find, Add, OK, Cancel, Apply, and Help.

Figure 12:
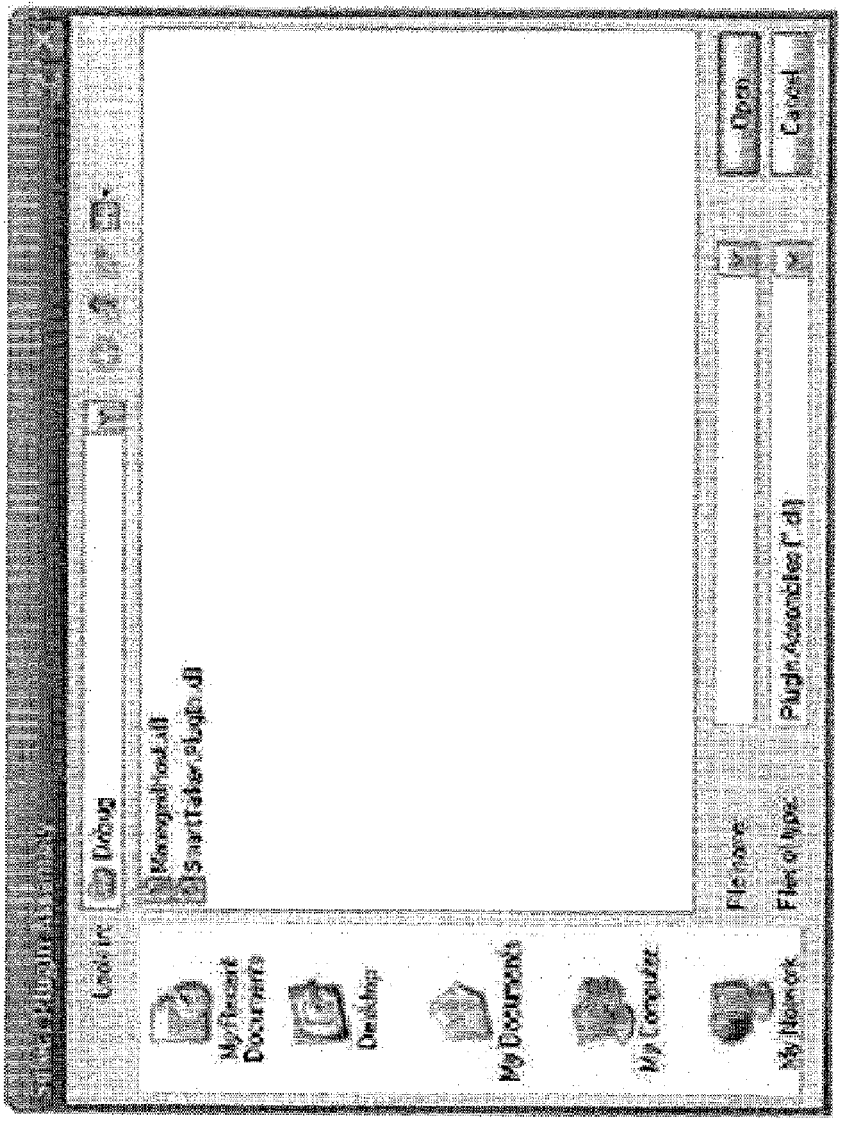

The Find button takes the user to an online catalog where developers have uploaded the plug-ins they have created and the Add button opens the File Open dialog box illustrated in FIG. 12.

Figure 13:
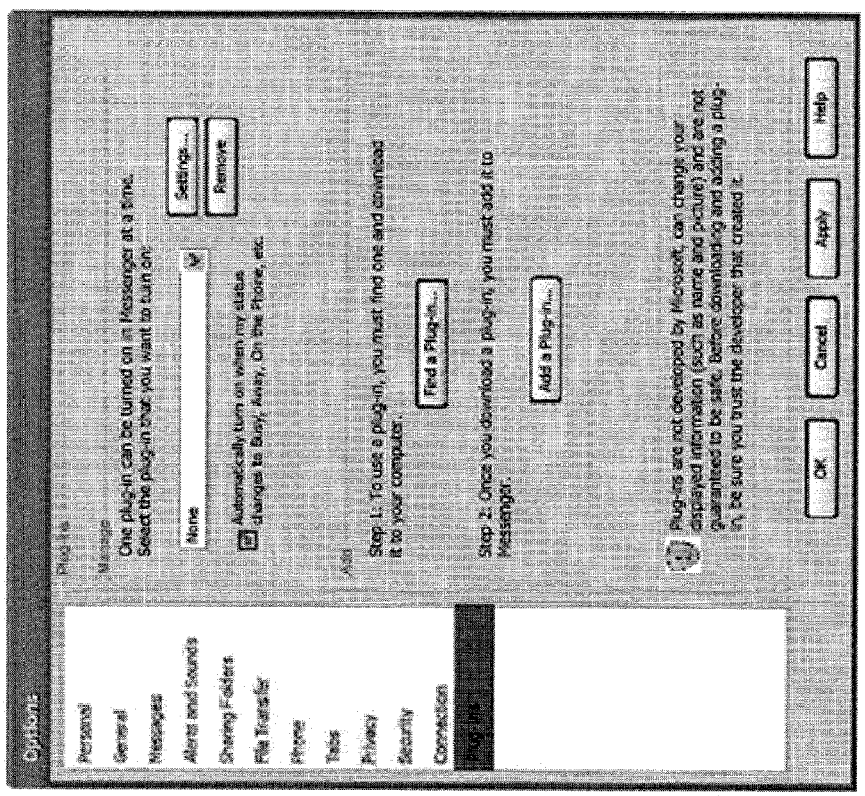

After the user selects a plug-in and clicks open, the Options dialog is shown again, this time showing the One or More Installed Plug-in screen illustrated in FIG. 13. Here, the "turn on" drop down is populated with all the available plug-ins on the machine. After the user adds their first plug-in, the turn on dropdown is automatically populated with the plug-in that was just added. The Settings button opens the plug-in's configuration dialog box if the developer created one. If no configuration dialog exists, this button is disabled. The Remove button removes the association between this plug-in and the messenger application. It does not remove the plug-in from the computer. The Add section of the dialog is the same as in the No Plug-in case: (1) find a Plug-in opens the default browser and navigates to the catalog of plug-ins; (2) the Add a Plug-in button opens the File Open dialog.

Figure 14:
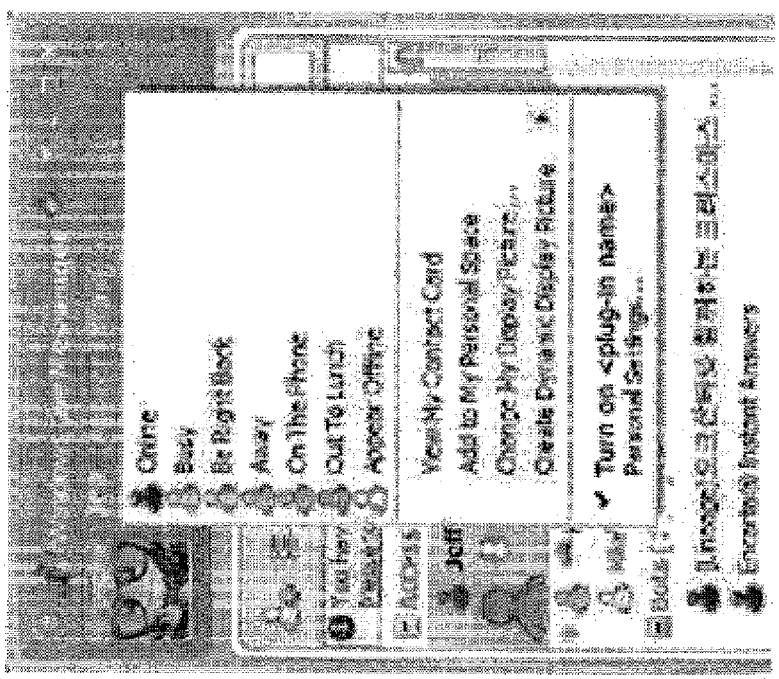

FIG. 14 illustrates a menu item that appears when the user has an active plug-in. When selected, a check appears next to the menu item and the plug-in is activated. When cleared, the check is hidden and the plug-in is de-activated. If the user selects to automatically turn the plug-in on while away, e.g. when the user's status changes to "On The Phone", this menu item is selected. The user can manually turn the plug-in off by clearing this selection. The plug-in will remain off until the user's status changes to away again, or until the user manually turns the plug-in back on.

Figure 15:
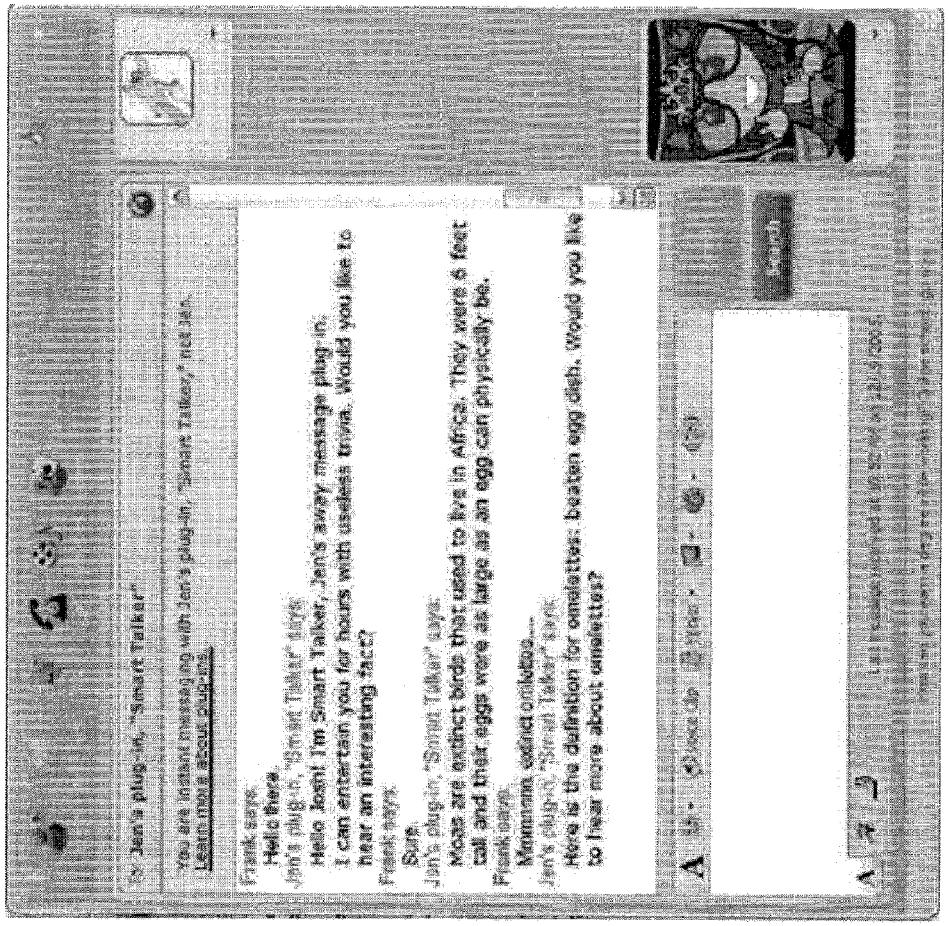

It is important, in some scenarios, that users know that they are talking to a plug-in and not to the user themselves. As a result, the name of the user on every "<display name> says:" entry in the conversation window is changed to "<display name>'s plug-in "<plug-in name>" says:" when the user is talking to a plug-in, as shown in FIG. 15. This change also applies in the message history.

Having selected and installed a plug-in, consider now some of the user or customer scenarios that plug-ins can provide.

The virtual buddy plug-in is a contact on a user's contact list which can be contacted only by the local user. This contact's identity (DDP, personal status message (PSM), Display Name, etc. . . . ) is defined by the code of the plug-in developer. The ways in which this plug-in interacts with the user is defined within the code of the plug-in developer. This interaction includes the ability for the plug-in to communicate with the user through the conversation of text, as well as personal expression such as winks and emoticons. Note that a particular plug-in does not need to specify its type (e.g. agent or virtual buddy). The instant messaging application can choose to expose the same plug-in as an agent or as a virtual buddy, or can allow the end-user to make that choice. Plug-ins which are Away Message Plugins can also switch to virtual buddies and vice versa.

Scenarios for Agents/Virtual Buddies

Away Message Plug-In

James is a recruiter and is always on the phone interviewing candidates. His default status when he signs in is "On the Phone". He doesn't like ignoring instant messages that come in while he's interviewing, but he can't respond to them without compromising his ability to interview well. One of his gaming contacts tells him about a new plug-in she created that responds to incoming messages with an apology for missing the message, the time that James will be available again, and an interesting, little-known fact. Contacts can continue to chat with the plug-in until James is available, or if they don't continue chatting with the plug-in James can review his missed messages and respond to them once he is available again.

Outlook Connector Plug-In

Cinthya is the vice president of a mid-size software company in the Bay Area and is constantly in meetings. Most of her communication with her direct reports is done via instant messaging in short breaks between meetings. She wants her direct reports to know when she is available next quickly, without making them check her calendar in her email program. She installs a plug-in that updates her personal status message (PSM) with the name of the meeting she is in and the time that she will next be free.

Language Translators

Users can use language translators as a plug-in if they are communicating with a buddy who does not speak the same language as they do. This can be in single party conversations or multi party conversations. The plug-ins that perform language translations will look at any text in the conversation window and display that text in a user specified language to the whole group. The Display name of the translator will indicate in both the originating and destination language that it is a plug-in performing translation. This allows multiple people who may have multiple languages which they speak to enable their plug-in translator and have the text that their users type translated to a language which they can understand. This also allows the text which they type to be translated to another language which the receiver can understand.

In the case of single party conversations, the originator of the message and the destination of the message stay constant. In supporting multi-party conversations, the translation can specify options where it will do different translations to different contacts. This information about which language a particular buddy understands can be stored away and used later for translation options when conversation with that particular buddy. The plug-in writer may also store away the information in a more public place where other plug-ins may share that information about a particular buddy so it may act appropriately without the user re-configuring multiple plug-ins to understand a particular language a buddy understands.

My.Pet

In using the My.Pet plug-in, a user can have a virtual pet as one of their virtual buddies. This pet can interact with the user the way a pet interacts with an owner. The pet needs food, attention, petting and the like. As the user provides more interaction with the pet through chatting with this virtual buddy, the pet can evolve. The evolution of this pet can be positive or negative, depending on the interaction of the user. For example, if the pet's needs are not provided for, the pet can go to a buddy of that user's machine to receive its needs. The owner of the pet can interact with the pet to tell it to certain things such as play checkers, or other two player games which would normally take two humans.

The pet can also have friends, such as those that appear on the user's contact list. Pets can also be trained to participate in competitions to win special prizes. Pets can also live in a variety of places such as the user's contact list, My Space, and the like.

Blogging

The blogging virtual buddy can provide the user with the ability to chat with this virtual buddy in a normal instant messaging conversation and have that conversation either typeset or edited by an AI virtual buddy and then posted to the user's Blog or Space. It can also post directly to the person's Blog or Space upon receiving text and place it on the person's Space verbatim. The virtual buddy can receive input from a users blog, such as that which corresponds to others' typed comments.

Encarta

An Encarta® bot can allow users to ask questions which the bot then answers by using Encarta®, a product of Microsoft. With the plug-in model, this same bot can allow the user to search local knowledge bases of Encarta® on the machine or other user specified knowledge bases, while allowing the user to narrow or widen the queries specific to the user.

Custom Rings

With plug-ins, a third party developer can design a feature that can signal a user with a particular sound when a buddy's presence changes. This custom sound can also be associated with the message received event and be customized for different buddies on a person's buddy list. In configuring this feature, a user can simply specify a particular sound to be associated with a particular buddy's event.

Spying on a Buddy's Presence

This feature can allow a person to specify different notifications upon a presence change of a particular buddy. On some instant messaging systems this is known as "tagging". When a user specifies a buddy which they wish to "tag" or "spy" upon, the user can specify the alert notification associated with that buddy's presence change. The alert notification can be a visual notification, audio notification, or logged indicator that the event has happened.

Dear Abby

Users who may want to ask for anonymous advice from a source can turn to a Dear Abby virtual buddy. This type of buddy will give the user anonymity for accessing a source for advice. The virtual buddy can use some knowledge of the user which it can collect from a Desktop search, web searches, conversation histories, as well as previous interactions with the user to generate answers.

Joke Telling

When users get bored and wish to entertain themselves, they tend to want to "chat" with someone. In the case where there is no one on their buddy list with whom they can chat, they can turn to a plug-in like the Joke Telling virtual buddy. This virtual buddy will engage the user and tell them jokes to amuse them.

Display Picture/Personal Expression

The display picture of a user can be adjusted using a dynamic display. This can be based, in part, on some portions of the conversation that a user is having. Further, an extension of this is to have the full text conversation and history of the conversation available to an Artificial Intelligence engine which can then generate predictable or appropriate Display pictures, personal status message (PSM), or Display Names.

CONCLUSION

The embodiments described above provide a standardized way to interact with and extend instant messaging applications. A platform is provided and enables developers and other third parties to create extensions for instant messaging applications. Through a set of APIs, interacting applications or plug-ins are "sandboxed" in their own areas where they are unable to perform unpermitted or unauthorized actions. The plug-in platform or architecture is integrated with the platform of the instant messaging application and can allow developers to create plug-ins that can interact with a local user and their buddies. Any number of various types of plug-ins can be developed and incorporated into the instant messaging application in a standardized manner.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising one or more processors; one or more computer-readable storage media; and computer-executable instructions on the one or more computer-readable storage media which, when executed by the one or more processors, implement a platform configured to: incorporate the plug-in in an instant messaging application, wherein the plug-in temporarily overrides an identity of a local user and acts as an agent which is exposed to contacts that have the local user as a buddy; operate plug-ins being further configured to function as all of:

a virtual buddy;
a personal assistant;
a remote control;
a provider of personal expression capabilities;
a provider of entertainment;
a provider of additional utility;
wherein when configured to function as the virtual buddy, the virtual-buddy configured plug-in comprises:
a contact stored on a contact list of the local user, the contact only being accessible by the local user;
a contact identity being defined by code from a developer of the plug-in;
an interaction definition as defined by code from the plug-in developer, the interaction definition defining the ability for the plug-in to communicate with the user via: text conversation; winks; emoticons; blogging; advice; joke telling;
wherein when configured to function as the personal assistant, the personal-assistant-configured plug-in includes email functions, calendaring functions, and voicemail functions, which enable the plug-in to perform tasks comprising: scheduling of meetings;
updating the local user's tile to reflect the local user's current status; interpretation of incoming messages;
sending responses detailing when the local user is available; negotiation between schedules to determine non-conflicting solutions; performance of answering machine-type functions; and
preparation and sending of responses based on a sender of an incoming message;
wherein when configured to function as the remote control, the remote-control-configured plug-in functionality comprising: integration with webcams;

integration with media players; system administration; configuration of home lighting systems; and interpretation of incoming messages;

wherein when configured to function as the provider of personal expression capabilities, the personal-expression-provider-configured plug-in functionalities comprising:

enabling a slide-show of user tiles;

enabling the local user to select different tiles based on the local user's mood;

interpreting outgoing messages based on keywords in the outgoing messages;

monitoring conversation;

using quotes as custom away messages; and telling jokes or stories, which are selected by the local user;

wherein when configured to function as the provider of entertainment, the entertainment-configured plug-in functionality comprising:

communication with a richly configured artificial intelligence bot;

gaming scenarios between two or more bots; and creation of an interactive pet;

wherein when configured to function as the provider of additional utility, the additional-utility-configured plug-in functionality comprising:

additional functionality to the instant messaging application, the additional functionality comprising: providing blogging sound; displaying user interface notifications; sending email; and searching; provision of different ring tones; spying on buddy status; provision of a question/answer search; and diagnostics; and sandbox the plug-in to prevent the plug-in from performing unpermitted or unauthorized actions and to thereby provide a degree of security to at least the instant messaging application.

2. The system of claim 1, wherein the platform is implemented using a .NET framework as a hosting platform.

3. The system of claim 2, wherein the plug-in is sandboxed using Code Access Security.

4. The system of claim 1, wherein the plug-in comprises a managed DLL.

5. The system of claim 1, wherein the platform provides a managed code environment and the plug-in is loaded inside the environment's processor space.

6. A system comprising: one or more processors; one or more computer-readable storage media; and computer-executable instructions on the one or more computer-readable storage media which, when executed by the one or more processors, implement a platform comprising:

native code having components that implement instant messaging functionality;

managed code associated with the native code and having components configured to incorporate one or more plug-ins that extend an instant messaging application, wherein the plug-ins temporarily override an identity of a local user and act as an agent which is exposed to contacts that have the local user as a buddy, and wherein the plug-ins are sandboxed to prevent the plug-ins from performing unpermitted or unauthorized actions and to thereby provide a degree of security to at least the instant messaging application;

two or more plug-ins being further configured to function as two or more of:

a virtual buddy; a provider of personal expression capabilities; a provider of additional utility;

wherein when configured to function as a virtual buddy, the virtual-buddy configured plug-in comprises: a contact stored on a contact list of the local user, the contact only being accessible by the local user; a contact identity being defined by code from a developer of the plug-in; an interaction definition as defined by code from the plug-in developer, the interaction definition defining the ability for the plug-in to communicate with the user via: text conversation; winks; emoticons; blogging; advice; joke telling;

wherein when configured to function as the provider of personal expression capabilities, the personal-expression-provider-configured plug-in functionalities comprising: enabling a slide-show of user tiles; enabling a user to select different tiles based on the user's mood; interpreting outgoing messages based on keywords in the outgoing messages; monitoring conversation; using quotes as custom away messages; and telling jokes or stores, which are selected by the local user;

wherein when configured to function as the provider of additional utility, the additional-utility-configured plug-in functionality comprising: additional functionality to the instant messaging application, the additional functionality comprising: providing blogging sound; displaying user interface notifications; sending email; and searching; provision of different ring tones; spying on buddy status; provision of a question/answer search; and diagnostics.

7. The system of claim 6, wherein the native code comprises a plug-in manager component that manages interaction between the instant messaging application and one or more plug-ins, and a managed host component that provides access to the managed code.

8. The system of claim 7, wherein the native code comprises one or more managed plug-in wrappers, individual wrappers being associated with individual plug-ins in the managed code, wherein the wrappers are configured to effect communication with an associated plug-in.

9. The system of claim 6, wherein the managed code comprises a managed host component that is configured to create application domains for individual plug-ins and create instances of individual plug-ins in an associated application domain.

10. The system of claim 9, wherein the managed code comprises a client component that is configured to receive API calls from plug-ins and fire events to plug-ins.

11. The system of claim 6, wherein:

the native code comprises:

a plug-in manager component that manages interaction between the instant messaging application and one or more plug-ins, and a managed host component that provides access to the managed code; and the managed code comprises:

a managed host component that is configured to receive API calls from the managed host component of the native code and, responsively, create application domains for individual plug-ins and create instances of individual plug-ins in an associated application domain.

12. The system of claim 11, wherein the native code comprises one or more managed plug-in wrappers, individual wrappers being associated with individual plug-ins in the managed code, wherein the wrappers are configured to effect communication with an associated plug-in; and wherein the managed code comprises a client component that is configured to receive API calls from individual managed plug-in wrappers and plug-ins, and to fire events to plug-ins.

* * * * *